2,792,912

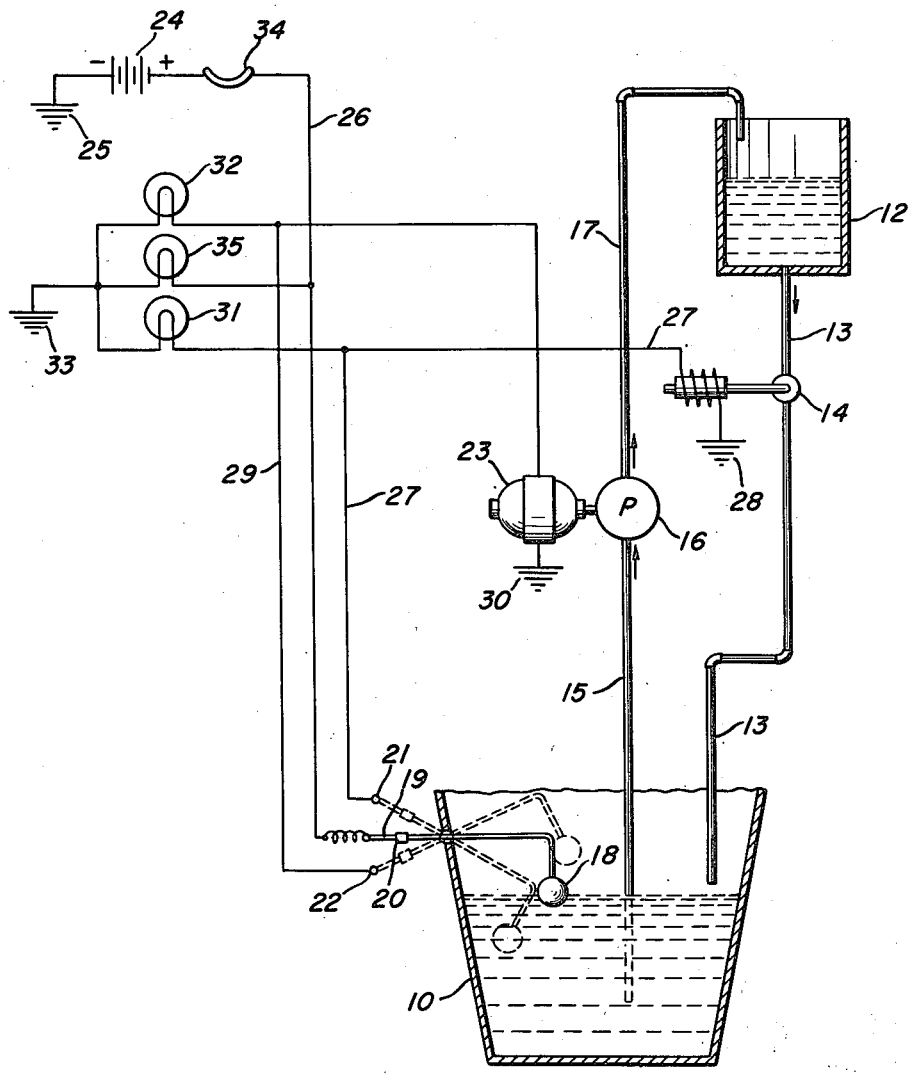
INVENTOR:
REINO W. KANGAS,
BY: Donald G. Dalton
his Attorney.

Patented May 21, 1957

United States Patent Office

2,792,912

AUTOMATIC CONTROL SYSTEM FOR LUBRICANT SUPPLY

Reino W. Kangas, Eveleth, Minn.

Application December 17, 1954, Serial No. 475,933

4 Claims. (Cl. 184—103)

This invention relates to an automatic control for maintaining the level of lubricant in an engine crankcase within a predetermined range.

An object of the invention is to provide an improved control which automatically replenishes lubricant in a crankcase when the level drops unduly or removes excess lubricant when the level rises unduly, as may be caused by dilution of the lubricant with fuel in a diesel engine.

A further object is to provide an improved control which also affords a visual indication of its operation and of the lubricant level and which automatically cuts out when the engine is tilted.

A more specific object is to provide an improved control which includes a float within the crankcase, an electric circuit operated by said float, a lubricant reservoir and valve for replenishing lubricant when the float operates the circuit in response to a low lubricant level, and a motor driven pump for returning lubricant to the reservoir when the float operates the circuit in response to a high lubricant level.

In accomplishing these and other objects of the invention, I have provided improved details of structure, a preferred form of which is shown in the accompanying drawing, wherein The single figure is a diagrammatic view of a lubricant control system constructed in accordance with my invention.

The figure shows schematically an engine crankcase 10 and a lubricant reservoir 12 mounted at a higher elevation. The engine can be of any conventional construction, such as a diesel or gasoline engine and hence is not shown in further detail. A pipe 13 extends from the bottom of the reservoir 12 to the crankcase 10 and contains a normally closed solenoid operated valve 14. A second pipe 15 extends from the crankcase to the inlet of a pump 16. A third pipe 17 extends from the discharge of this pump back to the reservoir 12. When the valve 14 opens, lubricant flows by gravity from the reservoir to the crankcase; when the pump 16 operates, lubricant returns to the reservoir.

A float 18 is pivotally mounted on the crankcase 10 and carries a contactor 19 which is electrically insulated from the crankcase by an insulator block 20. When the lubricant in the crankcase drops to a predetermined low level, the float moves to a position where the contactor 19 engages a contact 21. Such engagement completes a circuit which energizes the operating solenoid of the valve 14 to open this valve and thus restores the lubricant level to normal. Similarly when the lubricant rises to a predetermined high level, the float moves to a position where the contactor engages a second contact 22. The latter engagement completes a circuit which operates a motor 23 for driving the pump 16 and thus again restores the level to normal.

The operating circuit includes a battery or other source of power 24, one terminal of which is grounded to the engine frame or vehicle body, as indicated at 25. A conductor 26 fixedly connects the other terminal to the contactor 19. A conductor 27 connects the contact 21 with one end of the operating solenoid for the valve 14. The other end of this solenoid is grounded, as indicated at 28. A conductor 29 connects the contact 22 with one side of the motor 23. The other side of the motor is grounded as indicated at 30. Preferably low and high level indicator lights 31 and 32 are connected to the conductors 27 and 29 respectively in parallel with the solenoid and motor and are grounded as indicated at 33. These lights afford a visual indication when the lubricant level becomes too low or too high and signify that corrective action is underway.

When the control is used on a vehicle, the conductor 26 preferably contains a mercury level switch 34. When the vehicle is on uneven ground and the system tilts, the switch 34 opens to cut out the control and prevent false operations. When this switch is included, the control preferably has a third indicator light 35 connected between the conductor 26 and the ground 33. As long as the switch 34 is closed and the system is operative, the light 35 is energized to afford a visual indication. When the switch 34 opens, the light is extinguished to indicate that the system has been cut out.

From the foregoing description it is seen that my invention provides a simple and effective system for maintaining the level of lubricant in an engine crankcase within the proper range. Whenever the level drops unduly, the float completes a circuit to open the solenoid valve to allow lubricant to feed by gravity from the reservoir to the crankcase. Whenever the level rises unduly, the float completes a circuit to operate the pump to return excess lubricant to the reservoir. The system also furnishes a full visual indication of its operation.

While I have shown and described only a single embodiment of the invention, it is apparent that modifications may arise. Therefore, I do not wish to be limited to the disclosure set forth but only by the scope of the appended claims.

I claim:

1. The combination, with an engine crankcase, of a control for maintaining lubricant therein above a predetermined level comprising a lubricant reservoir located at a higher elevation than said crankcase, a pipe extending from said reservoir to said crankcase and adapted to feed lubricant from the former to the latter by gravity, a normally closed solenoid operated valve in said pipe, a float carried by said crankcase and adapted to move in accordance with the level of lubricant therein, an electric circuit operated by said float when the lubricant in said crankcase reaches a predetermined low level to open said valve to restore the lubricant level to normal and a switch in said circuit for rendering the control inoperative when tilted.

2. The combination, with an engine crankcase, of a control for maintaining the level of lubricant therein within a predetermined range comprising a lubricant reservoir located at a higher elevation than said crankcase, a pipe extending from said reservoir to said crankcase and adapted to feed lubricant from the former to the latter by gravity, a normally closed solenoid operated valve in said pipe, additional piping connecting said crankcase and reservoir and a motor driven pump in said additional piping for returning lubricant from said crankcase to said reservoir, a float carried by said crankcase and adapted to move in accordance with the level of lubricant therein, and an electric circuit connected to the solenoid of said valve and the motor of said pump and operated by said float when the lubricant in said crankcase reaches a predetermined low or high level to add lubricant to said crankcase or remove it therefrom and thus restore the level to normal.

3. A combination as defined in claim 2 including indicator lights connected in parallel with the solenoid of said valve and the motor of said pump to afford a visual indication of their operation.

4. A combination as defined in claim 2 including a switch in said circuit for rendering the control inoperative when tilted.

References Cited in the file of this patent

UNITED STATES PATENTS

| | | |
|---|---|---|
| 1,280,222 | Hester | Oct. 1, 1918 |
| 1,542,912 | Rockwell | June 23, 1925 |
| 1,587,922 | Rosson | June 8, 1926 |
| 2,671,529 | Hungerford | Mar. 9, 1954 |
| 2,739,608 | Brower | Mar. 27, 1956 |

FOREIGN PATENTS

| | | |
|---|---|---|
| 397,507 | Great Britain | Aug. 22, 1933 |
| 591,056 | Great Britain | Aug. 6, 1947 |